United States Patent [19]

Zemach et al.

[11] Patent Number: 5,412,903
[45] Date of Patent: May 9, 1995

[54] SEA CAGE FISH FARMING SYSTEM

[75] Inventors: Shalom Zemach, Kfar Yona; Yitzhak Farin, Ganei Tikva, both of Israel

[73] Assignee: Mefalim Ymiem Vashkoht Ltd., Tel Aviv, Israel

[21] Appl. No.: 197,993

[22] Filed: Feb. 17, 1994

[51] Int. Cl.⁶ ............................................. A01K 71/00
[52] U.S. Cl. ..................................................... 43/102
[58] Field of Search ............... 43/102, 103, 4.5, 4, 43/6.5

[56] References Cited

U.S. PATENT DOCUMENTS

| | | | |
|---|---|---|---|
| 1,903,276 | 3/1933 | Yanga | 43/102 |
| 3,494,064 | 2/1970 | Stein | 43/102 |
| 4,092,797 | 6/1978 | Azurin | 43/102 |
| 4,147,130 | 4/1979 | Goguel | 43/102 |
| 4,244,323 | 1/1981 | Morimura | 43/102 |

*Primary Examiner*—Kurt Rowan
*Attorney, Agent, or Firm*—Mark M. Friedman

[57] ABSTRACT

A fish cage system, which includes a fish cage having one or more cables connected to it. The fish cage and cable(s) have a combined buoyancy which is such that at least a portion of the fish cage is normally located at or above the water surface. The cable(s) are connected to a sinker whose weight is sufficient to overcome the combined buoyancy of the fish cage cable(s). The sinker is also connected to a second cable which is connected to a buoy. The buoy contains a winch for alternately shortening and lengthening the effective length of the second cable so as to alternately allow said fish cage to float or to submerge.

11 Claims, 4 Drawing Sheets

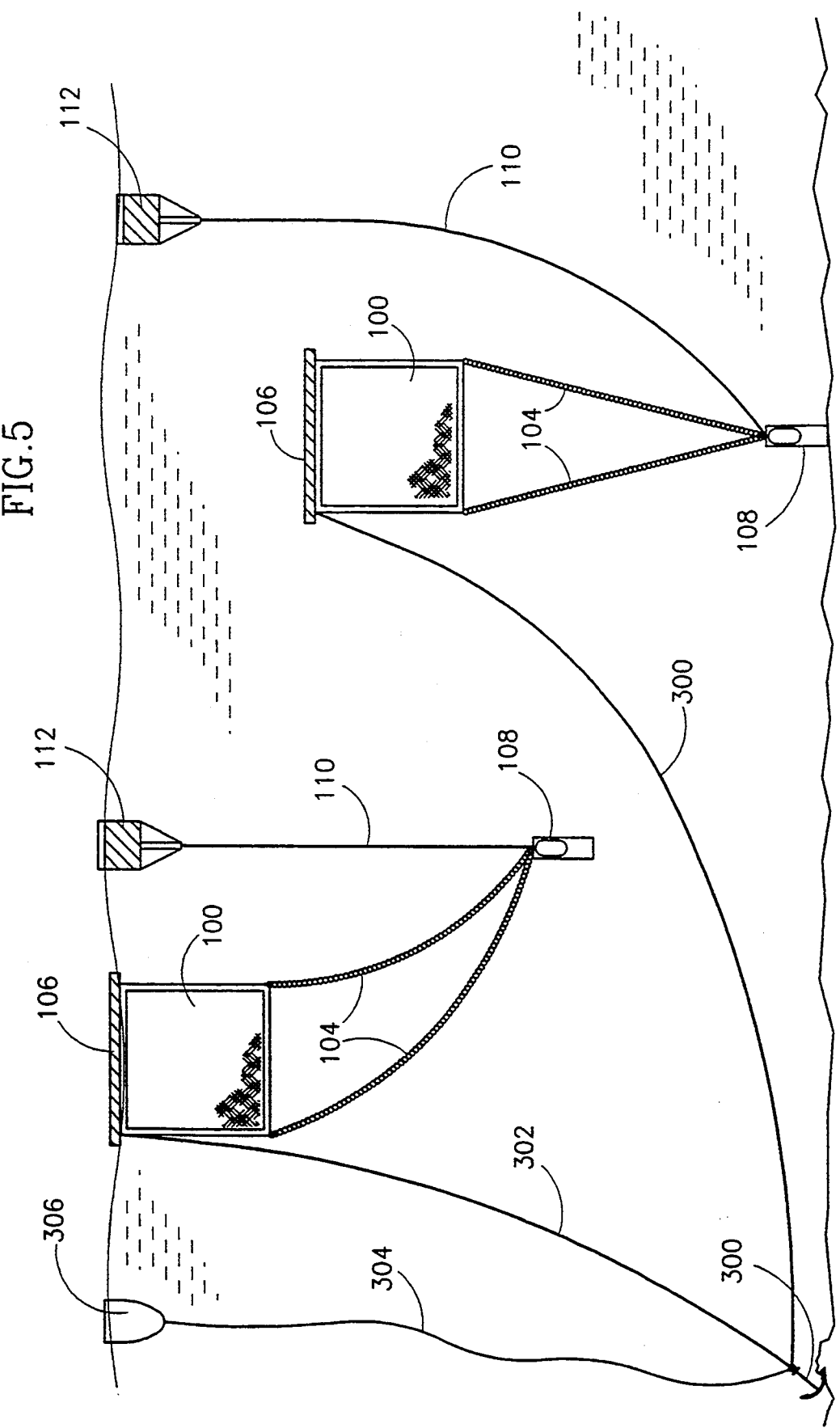

SEA CAGE FISH FARMING SYSTEM

FIELD AND BACKGROUND OF THE INVENTION

The present invention relates to systems for farming fish in cages and, more particularly, to fish farming systems having a cage which can be submerged and refloated as desired.

Considerable efforts have been made in an attempt to supply the rapidly increasing worldwide demand for fish protein. In addition to increasingly sophisticated open sea fishing, a significant fraction of the fish on the market today are raised and harvested using modern aquaculture techniques. Various fish farms have been successfully operating in large man-made pools. However, these farms are expensive to build and operate and do not always make it possible to reproduce optimal conditions for the growth of the fish.

More recently, fish farming has been increasingly carried out in large cages which are made to float near or at the water surface just offshore (hereinafter "nearshore") in seas, lakes or other natural bodies of water. A fish cage system includes one or more large cages which are typically constructed of a rigid frame of some suitable shape and covered by netting which allows water to flow freely into and out of the cage but which is of sufficiently fine mesh as to retain the fish inside the cage.

The advantage of such fish cage systems is that they do not take up scarce real estate and do not require the building of an expensive pool. Furthermore, the water conditions (e.g., salinity, temperature, oxygen content, and the like) approximate natural conditions in the open body of water and may be more optimal for the growth of the fish than conditions simulated in man-made onshore pools.

While the nearshore deployment of such fish cages is convenient in terms of accessibility, such deployment suffers from certain disadvantages. As nearshore aquaculture develops there is an increasing shortage of quality sites in which to locate additional cages. Many sites suffer from oxygen depletion caused by fish waste and uneaten fish food as well as from industrial, agricultural and domestic runoffs from the nearby shore.

It is therefore often advantageous to avoid onshore locations and to locate the cages farther offshore, in areas which are not adversely affected by runoffs and where the greater water circulation serves to dilute fish farm wastes.

However, locating fish cage systems in locations which are remote from the shore poses certain problems. Chief among these is the need to ensure the seaworthiness of the fish cage system in conditions, such as large waves and strong winds during storms, which may be much more severe than those experienced by nearshore structures.

Furthermore, it is known that during storms when the water near the water surface is particularly turbulent, fish, which normally spend most of the their time near the water surface where the supply of oxygen is most abundant, tend to temporarily relocate themselves away from the surface to depths where the water is relatively unaffected by the storm and thus avoid damage and stress to themselves.

To minimize or eliminate damage to both the fish and the cages, several fish cage systems have been developed which make it possible to submerge the fish cage to a certain depth when desired, e.g., prior to the onset of a storm, to avoid cold surface water and/or surface ice in winter and hot surface water in summer, or to avoid various toxic contaminants, such as toxic plankton blooms or an oil spill.

One such system is the Trident (Trademark) Sea Cage System marketed by Innovation & Development Partners Inc. of Nepean, Ontario, Canada. The Trident system, shown schematically in FIGS. 1a and 1b, includes a spherical cage 10 and a mooring system. The mooring system includes a large mooring anchor 11 through which the mooring cable 12 is led (apparently through a suitable pulley, or similar mechanism, which is not shown in the figures) to a modified crown buoy 14 and thence to the second mooring anchor 16. Tension on mooring cable 12 is maintained by the buoyancy of crown buoy 14 which includes two chambers. Under normal conditions, the lower chamber of crown buoy 14 provides permanent flotation designed to tension mooring cable 12 so as to submerge the floating cage 10 to the desired degree (FIG. 1a). In this condition, the upper chamber of crown buoy 14 remains completely filled with water. When it is desired to fully submerge cage 10, water is blown out of the upper chamber of crown buoy 14 using compressed air which greatly increases the buoyancy of crown buoy 14 causing it to rise and to submerge cage 10 to a predetermined depth (FIG. 1b).

Another system is the Atoll 250 marketed by Aquavar of France. A portion of the Atoll 250 system is depicted schematically in FIG. 2. Here, as in the Trident system described above, a number of large mooring anchors 20, 22 and 24, are used and are provided with pulleys 26, 28 and 30 through which one or more mooring cables 34 can move. A buoy 32 is provided to alternately take in and release mooring cable 34 which, in turn, determines the position of fish cage 36.

A disadvantage of both systems is that they use large permanent mooring anchors which do not allow the system to be easily redeployed in other locations as the need arises. Furthermore, each of the systems requires pulleys or similar mechanisms located near the permanent mooring anchors near the sea floor. Such devices typically require expensive maintenance, involving the services of skilled divers. The need to access the mechanisms near the sea floor puts a practical limit on the maximum depth at which such systems can be usefully deployed.

Typically, such systems are not deployed in waters which are deeper than about 30 meters. While such depths may be sufficient in some circumstances, in other cases it may be desirable to lower a fish cage to a greater depth. Furthermore, it may, in some cases, be desirable to deploy fish cages in waters which are considerably deeper than 30 meters, without regard to the depth to which it is desired to submerge the cage.

There is thus a widely recognized need for, and it would be highly advantageous to have, a fish cage system which would be easily deployed in waters of virtually any depth, which would allow the fish cages to be submerged in a controlled manner to virtually any depth and which would be easily and readily redeployed to other locations.

SUMMARY OF THE INVENTION

According to the present invention, there is provided a fish cage system, comprising: (a) a fish cage including at least one fish cage cable of fixed length connected to the fish cage, the fish cage and the fish cage cable having a combined buoyancy such that at least a portion of the fish cage is located at or above the water surface when no external forces are exerted upon the fish cage or on the fish cage cable; (b) a displaceable sinker connected to the fish cage cable, the weight of the sinker being sufficient to overcome the combined buoyancy of the fish cage and the fish cage cable, the sinker being further connected to a sinker cable which is different from said fish cage cable; (c) a floating device connected to the sinker cable; and (d) means for alternately shortening and lengthening the effective length of the sinker cable so that, when the effective length is sufficiently short, said sinker is supported by said sinker cable and at least a portion of the fish cage is located at or above the water surface and, when the effective length is sufficiently long, said sinker is supported by the at least one fish cage cable and said fish cage is submerged below the water surface.

According to further features in preferred embodiments of the invention described below, the means for shortening and lengthening includes a winch mechanism located at the buoy.

According to still further features in the described preferred embodiments, the system further includes an anchor and an anchor cable connecting the anchor to the system.

The present invention successfully addresses the shortcomings of the presently known configurations by providing a an easily redeployable fish cage system which can be used in virtually any water depths and which can be used to submerge the fish cages to virtually any desired depth.

The fish cage system according to the present invention includes a fish cage which is connected to a sinker. The sinker is, in turn, connected to a buoy which includes means for lifting or lowering the sinker.

When it is desired to allow the fish cage to float near the water surface the buoy supports the full weight of the sinker while the cable connecting the fish cage and the sinker is slack. When it is desired to submerge the fish cage, the cable connecting the buoy and sinker is allowed to lengthen which eventually causes the full weight of the sinker to be exerted on the fish cage, overcoming its buoyancy and submerging the cage. When the sinker reaches the sea floor, the fish cage stays suspended above the sinker at a distance from the sea floor which is determined by the length of the cable connecting the fish cage and sinker.

BRIEF DESCRIPTION OF THE DRAWINGS

The invention is herein described, by way of example only, with reference to the accompanying drawings, wherein:

FIG. 5 depicts a system as in FIGS. 3 and 4 in both conditions and further includes an anchor.

DESCRIPTION OF THE PREFERRED EMBODIMENTS

The present invention is of a fish cage system which can be used to grow fish in a body of water of virtually any depth and which gives the ability of submerging the fish cage to virtually any desired depth.

The principles and operation of a system according to the present invention may be better understood with reference to the drawings and the accompanying description.

Figure 1A:
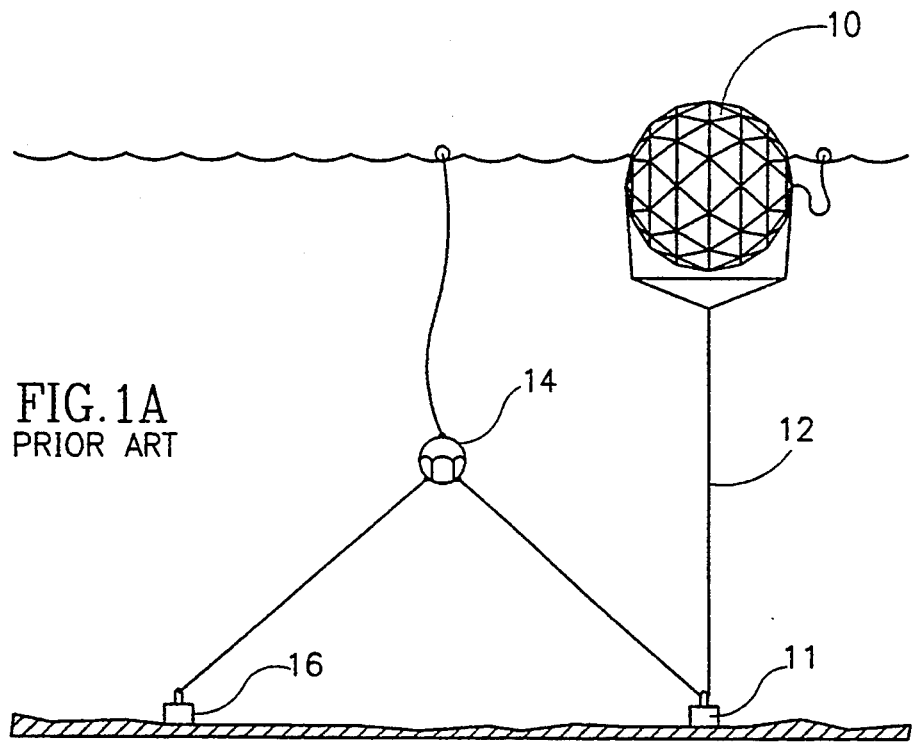
FIGS. 1a and 1b schematically depict one prior art submersible fish cage system in the floating and submerged conditions, respectively.
Figure 1B:
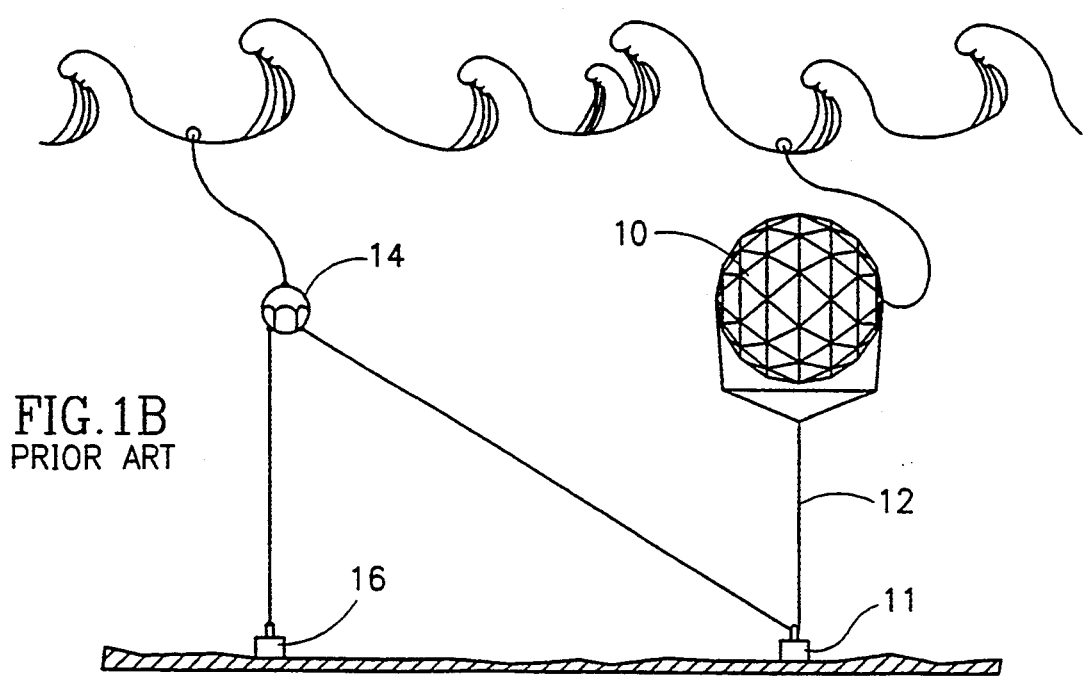
Figure 2:
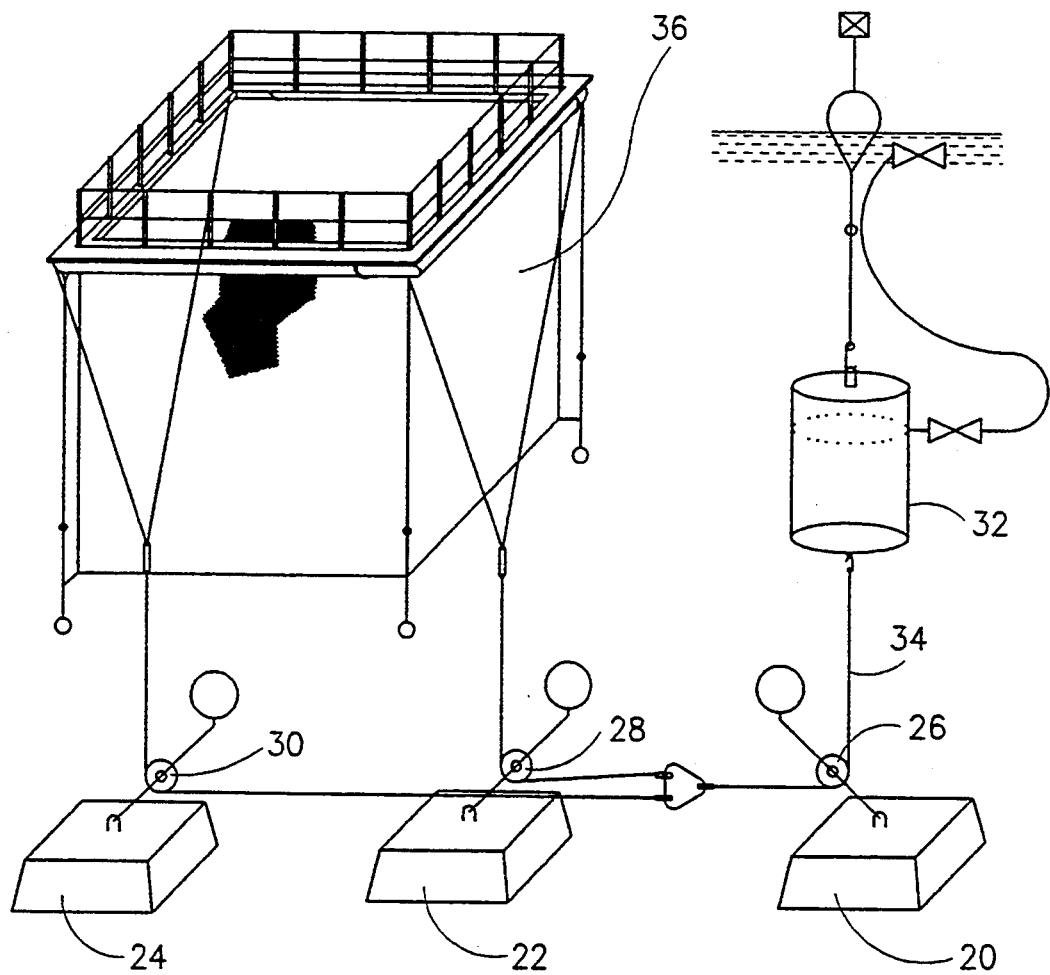
FIG. 2 schematically depicts a second prior art submersible fish cage system.
Figure 3:
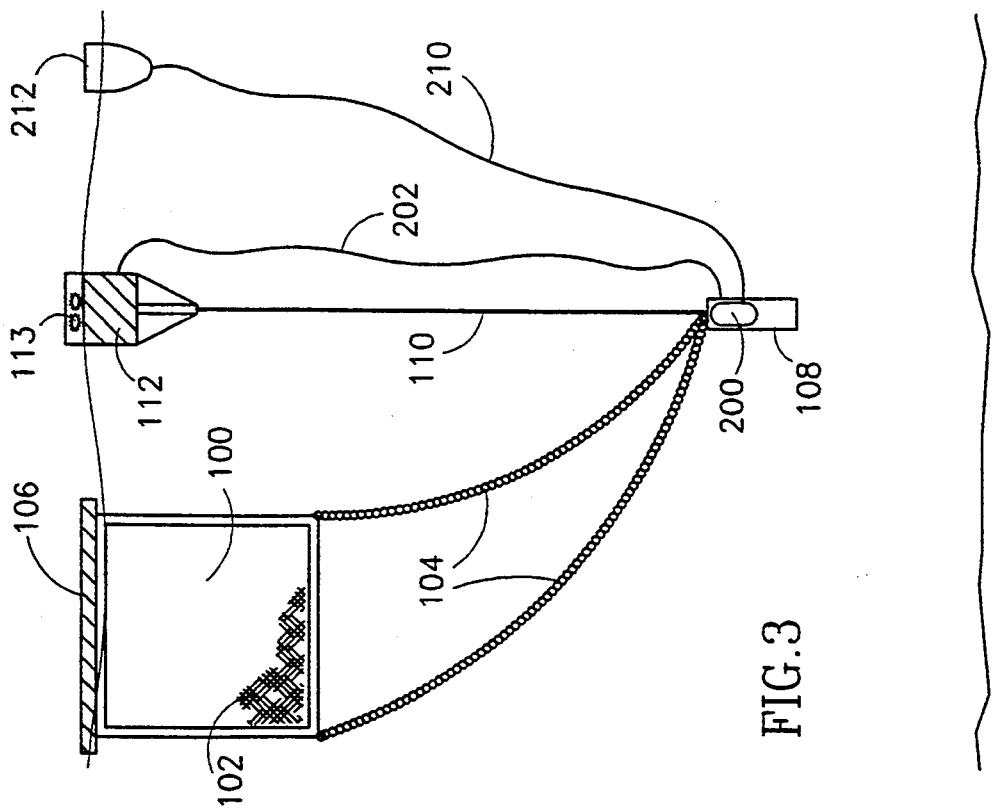
FIG. 3 schematically depicts a fish cage system according to the present invention in the floating position.

Referring now to the drawings, FIG. 3 illustrates a typical system according to the present invention. The system includes a fish cage 100 of any suitable size and dimensions, including, but not limited to, the designs of the prior art systems shown in FIGS. 1a, 1b and 2, as well as many others. Typically, cage 100 is made of a metal skeleton structure on which is superimposed a netting 102 (shown partially) of suitable mesh size which allows water to flow freely through cage 100 but does not allow fish inside cage 100 to escape.

Attached to cage 100 in any suitable manner are one or more fish cage cables 104. While two such cables are shown in FIG. 3, in some circumstances a single cable may be used or more than two cables may be used. The term 'cable' as used herein is to be understood to include cables, chains, ropes, and the like made of various materials and of designs, provided they are suitable for the purposes described herein.

The cage 100 and fish cage cables 104 have a combined buoyancy, imparted, for example, through buoyancy chambers or members 106 or other known means, which is directed upward so that at least the upper portion of cage 100 floats at or somewhat above the surface of the water, as shown in FIG. 3. Thus, when no downward forces are exerted on cage 100 it tends to float at or near the water surface, which is the normal condition for the raising of fish.

As described above, at certain times, such as before the onset of a storm which may create water turbulence which could damage the cage and/or the fish, it is desirable to temporarily lower cage 100 to a certain depth.

For this purpose, a system according to the present invention is further equipped with a sinker 108 which is connected to fish cage cable 104. The sinker may be of any suitable design and may contain solid and/or liquid and/or gas. In a basic embodiment according to the present invention, sinker 108 is of fixed and invariable weight which is selected to overcome the combined net buoyancy of fish cage 100 and fish cage cables 104 described above, so that when the weight of sinker 108 is added to fish cage 100 and fish cage cables 104 the result is the submersion, preferably at a slow and controlled rate, of cage 100.

Sinker 108 is further connected to a sinker cable 110 which is also connected to a buoy 112 of any suitable design. Buoy 112 is designed to float at the water surface under all conditions, as described in more detail below. Buoy 112 is equipped with means for alternately shortening and lengthening the effective length of sinker cable 110, which is preferably a suitable winch mechanism 113 housed within buoy 112, typically one which is operated by an internal combustion engine.

The operation of a system according to the present invention is as follows. During normal operations, cage 100 is allowed to float at the water surface, as shown in FIG. 3. As described above, the buoyancy of cage 100 (plus fish cage cables 104) is such that cage 100 remains at the water surface. It is to be noted that in this condition no external forces are exerted on fish cage cables 104 which stay slack in the water. Fish cage cables 104 are slack since sinker 108 to which they are also connected is being fully supported by buoy 112, through sinker cable 110 which is taut (FIG. 3). Buoy 112 is designed to have sufficient buoyancy to support sinker 110 (and sinker cable 110) while still floating at the water surface.

Whenever it desired to submerge cage 100, sinker cable 110 is allowed to lengthen, preferably at a controlled rate. The lengthening may be effected, for example, by releasing a brake mechanism on the winch 113 housed in buoy 112. The weight of sinker 108 then pulls sinker cable 110 out of winch 113, causing it to lengthen as sinker 108 goes deeper. As sinker 108 continues to go deeper there comes a point when fish cage cables 104 become taut, shifting the weight of sinker 108 from sinker cable 110, which becomes slack, to fish cage cables 104 which become taut. Beyond this point, the full weight of sinker 108 is exerted on cage 100. As described above, the incremental weight of sinker 108 is sufficient to overcome the buoyancy of cage 100 and brings about the submersion of cage 100. Preferably, the submersion takes place at a slow rate in order to minimize or eliminate damage to the structures and to the fish. Such a slow rate of submersion can be assured, for example, by carefully selecting the weight of sinker 108 so that the combined weight of the system is just slightly larger than the upwardly directed buoyancy forces.

Figure 4:
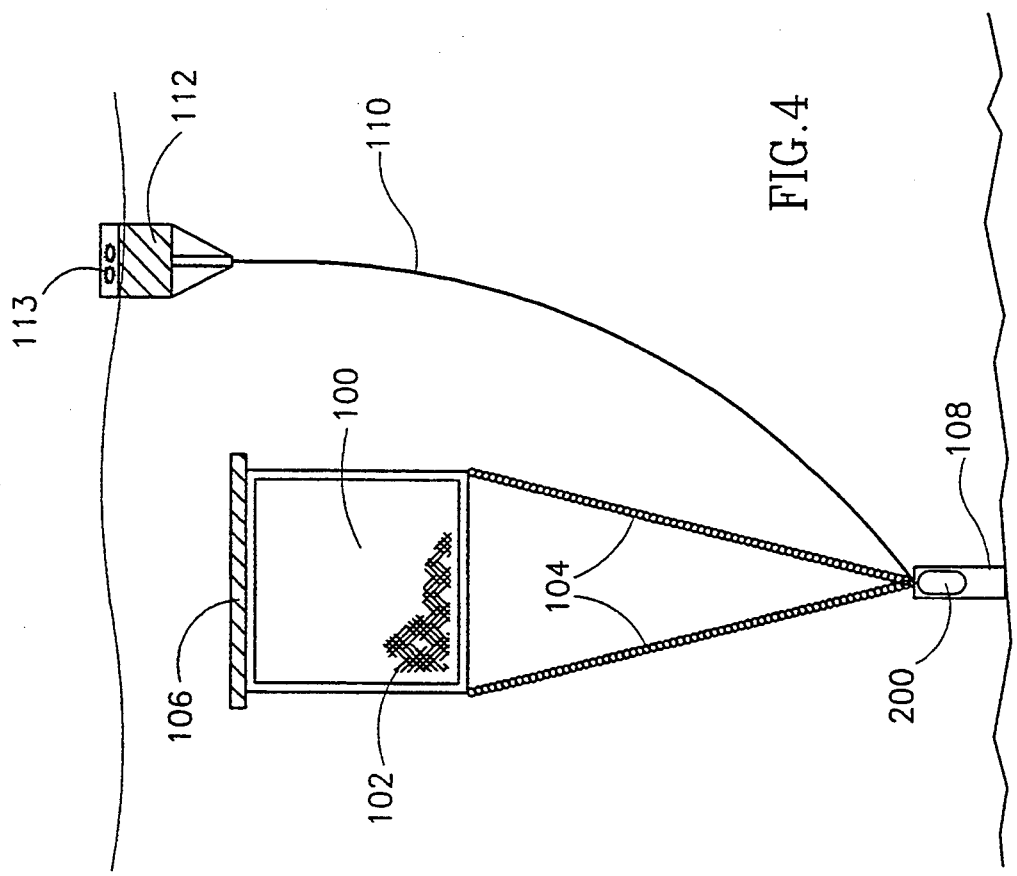
FIG. 4 depicts the system of FIG. 3 in the submerged condition.

The submersion of cage 100 continues as long as sinker 108 exerts forces on cage 100. As soon as sinker 108 hits bottom these forces are eliminated and cage 100 ceases to move downwardly. Instead, cage 100 stabilizes at a location which is determined by the length of fish cage cables 104 (FIG. 4).

The system described herein is highly versatile for the deployment of submersible cages since it can be used when operating in waters of various depths and can easily submerge the cages to virtually any desired depth. To facilitate operations in water of great depth all that is required is that there be provided a sufficient length of sinker cable 110. To locate the submerged cage at a certain depth, without regard to the depth of the water, all that is required is the correct length of fish cage cables 104.

For example, if it is desired to operated in waters of 200 meters depth and if it is further desired to submerge the cages to a depth of approximately 100 meters, it is required that sinker cable 110 be at least 200 meters long and that fish cage cables 104 be approximately 100 meters long.

Once it is desired to have cage 100 resume its normal position at the water surface, winch 113, or a similar mechanism, is activated to take up sinker cable 110. When sinker cable 110 becomes taut, winch 113 lifts sinker 108 off the bottom and removes its weight from cage 100 whose buoyancy forces now allow it to climb to the surface, preferably at a sufficiently slow rate to avoid structural damage to the system and physiological damage (e.g., the bends) to the fish.

Preferably, the lower portions of buoy 112 are shaped to avoid being lifted by cage 100 when cage 100 is raised to the water surface. For example, the lower portions of buoy 112 as shown in FIGS. 3 and 4 are shaped so that as cage 100 is raised to the water surface, cage 100 tends to push buoy 112 away as the upper edge of cage 100 slides up along the ramped lower portions of buoy 112.

In alternative embodiments according to the present invention, instead of a winch mechanism, the lifting and lowering of sinker 108 can be effected by other means, such as through the use of a ballast chamber 200 in sinker 108. Compressed air, for example, from a compressed air pipe 202 (FIG. 4) running to buoy 112, could be used to force water out of ballast chamber 200 thereby increasing the buoyancy of sinker 108 sufficiently to raise sinker 108. When it is desired to lower sinker, water is allowed to enter ballast chamber 200 and displace the air.

In another embodiment according to the present invention, sinker 108 is raised and lowered using winch mechanism 113 as in the basic embodiment. However, to ensure that cage 100 can be lifted when desired even when winch 113 is, for some reason, inoperative, sinker 108 is provided, as a backup safety measure, with a ballast chamber 200 and a compressed air line 202 to allow sinker (and thus cage 100) to be lifted.

In an alternative embodiment according to the present invention, sinker 108 is further connected to an auxiliary sinker cable 210 whose upper end is housed in an auxiliary buoy 212 at the water surface (FIG. 3). Auxiliary sinker cable 210 and auxiliary buoy 212 serve as a safety backup system, allowing sinker 108 (and therefore cage 100) to be raised when other means for lifting have failed. Thus, in the event of a failure of the lifting system, a service boat can approach auxiliary buoy 212, grasp auxiliary sinker cable 210 and, using its own onboard winch mechanism, lift sinker 108.

Shown in FIG. 5 is a typical system according to the present invention, with one cage depicted in the floating position and another in the submerged position. Here the fish cage system further includes an anchor 300, which may be similar to the type normally used by boats and ships, which rests on the floor and serves to localize the system. Anchor cables 302 connect anchor 300 to the cage systems. Preferably, anchor 300 is also connected to a secondary anchor cable 304 whose other end is located in an anchor buoy 306, thus providing ready means for the lifting of anchor 300 whenever it desired to redeploy the system in a different location.

While the invention has been described with respect to a limited number of embodiments, it will be appreciated that many variations, modifications and other applications of the invention may be made.

What is claimed is:

1. A fish cage system, comprising:
   (a) a fish cage including at least one fish cage cable of fixed length connected to said fish cage, said fish cage and said fish cage cable having a combined buoyancy such that at least a portion of said fish cage is located at or above the water surface when no external forces are exerted upon said fish cage or on said fish cage cable;
   (b) a displaceable sinker connected to said fish cage cable, the weight of said sinker being sufficient to overcome said combined buoyancy of said fish cage and said fish cage cable, said sinker being further connected to a sinker cable which is different from said fish cage cable;
   (c) a floating device connected to said sinker cable; and
   (d) means for alternately shortening and lengthening the effective length of said sinker cable so that, when said effective length is sufficiently short, said sinker is supported by said sinker cable and at least a portion of said fish cage is located at or above the water surface and, when said effective length is sufficiently long said sinker is supported by said at least one fish cage cable and said fish cage is submerged below the water surface.

2. A system as in claim 1, wherein said means for shortening and lengthening includes a winch mechanism.

3. A system as in claim 2, wherein said winch mechanism is located at said buoy.

4. A system as in claim 1, wherein said sinker includes a ballast chamber and wherein said means for shortening and lengthening includes alternately adding or removing water from said ballast chamber.

5. A system as in claim 1, wherein said buoy is shaped to avoid being lifted by said fish cage when said fish cage is raised to the water level.

6. A system as in claim 1, wherein the effective length of said fish cage cable is selected to determine the distance above the floor at which said fish cage is to be submerged.

7. A system as in claim 1, wherein said fish cage is substantially spherical.

8. A system as in claim 2, wherein said sinker includes a ballast chamber, further comprising sinker lifting means for increasing the buoyancy of said sinker, said sinker lifting means including means for removing water from said ballast chamber.

9. A system as in claim 2, further comprising sinker lifting means for lifting said sinker, said sinker lifting means including a sinker lifting cable connected to said sinker and floating near the water surface.

10. A system as in claim 1, further comprising an anchor and an anchor cable connecting said anchor to the system.

11. A system as in claim 10, further comprising a secondary anchor cable connected to said anchor and floating near the water surface.

* * * * *